United States Patent [19]

Baldwin

[11] 4,195,441
[45] Apr. 1, 1980

[54] SOLAR GREENHOUSE

[76] Inventor: Richard E. Baldwin, 8946 Carr St., Broomfield, Colo. 80020

[21] Appl. No.: 927,416

[22] Filed: Jul. 24, 1978

Related U.S. Application Data

[63] Continuation-in-part of Ser. No. 799,658, May 23, 1977, abandoned.

[51] Int. Cl.² ............................ A01G 9/00; F24J 3/02
[52] U.S. Cl. .......................................... 47/17; 126/428; 165/18
[58] Field of Search ............... 47/17, 59, 65; 126/270, 126/271; 165/48 S, 18; 237/1 A

[56] References Cited

U.S. PATENT DOCUMENTS

| | | | |
|---|---|---|---|
| 2,193,911 | 3/1940 | Wright | 47/17 |
| 3,980,130 | 9/1976 | Thomason et al. | 126/271 X |
| 3,981,151 | 9/1976 | St. Clair | 47/17 X |
| 4,069,593 | 1/1978 | Huang | 126/270 X |
| 4,143,705 | 3/1979 | Awalt | 165/18 |

FOREIGN PATENT DOCUMENTS

| | | | |
|---|---|---|---|
| 1122396 | 8/1968 | United Kingdom | 47/17 |
| 387670 | 10/1973 | U.S.S.R. | 47/17 |
| 568796 | 9/1977 | U.S.S.R. | 47/17 |

*Primary Examiner*—Robert E. Bagwill

[57] ABSTRACT

A solar greenhouse wherein plants are grown and utilized as collectors to absorb solar radiation and produce heat laden humidified air through the process of evapotranspiration. This humidified air is then further heated by solar energy. Energy is then extracted from the humidified air by cooling the air and condensing the water vapor within the air. The extracted heat can then be stored and utilized as required to heat the greenhouse and plants.

24 Claims, 22 Drawing Figures

SOLAR GREENHOUSE

This application is a continuation in part of Application Ser. No. 799,658 filed May 23, 1977 entitled Solar Energy Greenhouse System (now abandoned).

BACKGROUND OF THE INVENTION

1. Field of the Invention

This invention relates to greenhouses and to solar energy collection and environmental control apparatus and more particularly to a novel solar greenhouse and a novel method and apparatus for collecting and utilizing solar energy.

2. Background of the Invention

Conventional dynamic solar energy collection systems generally utilize black or dark colored collector plates or bodies to collect and absorb solar radiation. This collected energy is then generally transferred through convection and conduction to a transfer medium such as air or water which is transported to a location where the energy can be extracted for storage or use. Because heat collection and transfer in systems of this nature is a function of the surface area and conductive nature of the collector plates, these plates must necessarily have relatively large surface areas and be constructed of expensive specialized materials. In addition, to collect a usable quantity of heat the collectors must necessarily be operated at relatively high temperatures making the exchange temperature to the transfer medium relatively high and thus detracting from the overall efficiency of the system.

The conventional greenhouse because of its large window area is a generally energy wasteful system. Most conventional greenhouses do not employ solar collection apparatus for heating the structure during periods of heat loss and if solar heating apparatus is utilized it is generally passive in nature or of the conventional conduction convection collector plate type previously described.

The greenhouse and solar collection system of the present invention do not utilize the aforementioned collector plates and high temperature conduction and convection process to collect and transfer solar energy but rather employ biomass collectors and an adiabatic phase change heat transfer process. In the preferred form of the invention plants or biomass in a greenhouse system are utilized to collect solar energy and convert this energy to latent heat by the process of evapotranspiration in which water is vaporized by the plants to form humidified air. This collected energy can then be efficiently extracted from the humidified air for usage in heating the greenhouse by condensing the vapor in the air back to a liquid.

Plants, being approximately 95 percent water and of a generally dark color and large surface area are very effective solar energy collectors and efficiently transfer this energy to the transport medium, humidified air. In a conventional greenhouse this energy laden air is usually exhausted to the atmosphere and wasted. Under optimal conditions a total conversion of up to eightly five percent of the absorbed solar radiation may be realized. Two to four percent of this energy is converted to biomass by photosynthesis and the remainder is converted to latent heat by evapotranspiration. The greenhouse of the present invention recovers and utilizes this energy for heating the structure.

SUMMARY OF THE INVENTION

A solar energy greenhouse wherein plants are grown and utilized as collectors to absorb solar radiation and produce heat laden humidified air through the process of evapotranspiration. This humidified air is then further heated by solar energy. Energy is then extracted from humidified air by cooling the air and condensing the water vapor within the air. The extracted heat can then be stored and utilized within the greenhouse system as required.

In a preferred form of the invention the plant collectors are contained in an enclosed translucent greenhouse which is provided with a growing bed and automatic watering and feeding systems for the plants. The humidity and temperature of the plants and their root system are controlled by blowers which circulate air around the plants and around their roots through a duct system in their growing beds. The heat laden humidified air produced by the plants by evapotranspiration is contained within the greenhouse which is first circulated through the supporting structure of the greenhouse which is black to absorb solar radiation and act as a preheating element for the air. The preheated humidified air is then circulated through a condensation bed located below and adjacent to the plant growing bed where its energy is absorbed and vapor in the air is condensed to liquid. The hot condensate water formed is then conducted to an insulated condensate container where it is stored. During periods of heat loss from the greenhouse heat can be extracted at a controlled rate from the condensate water and also from the condensation bed itself to maintain the plants and their root systems at an optimum growing temperature.

In one embodiment of the invention heat is extracted from the hot condensate for heating the plants by circulating condensate from the condensate tank through the growing bed. In addition heat flow occurs by conduction from the condensation bed itself to the growing bed at a rate controlled by an insulating layer between the two beds.

The energy contained in the condensation bed is regulated so that the energy in the bed is depleted each night by an amount expected to be gained during a following sunny day. If heat loss from the condensation bed to the growing bed is insufficient to deplete this energy, cool outside air can be circulated through the condensation bed for lowering the temperature and energy content of the bed.

In addition to these systems the greenhouse is also provided with conventional heating and cooling back up systems and an automated curtain insulating system to help regulate heat losses and gains from the translucent walls of the greenhouse.

Other objects, advantages and capabilities of the present invention will become more apparent as the description proceeds taken in conjunction with the following drawing in which.

DETAILED DESCRIPTION OF THE INVENTION

Figure 1:
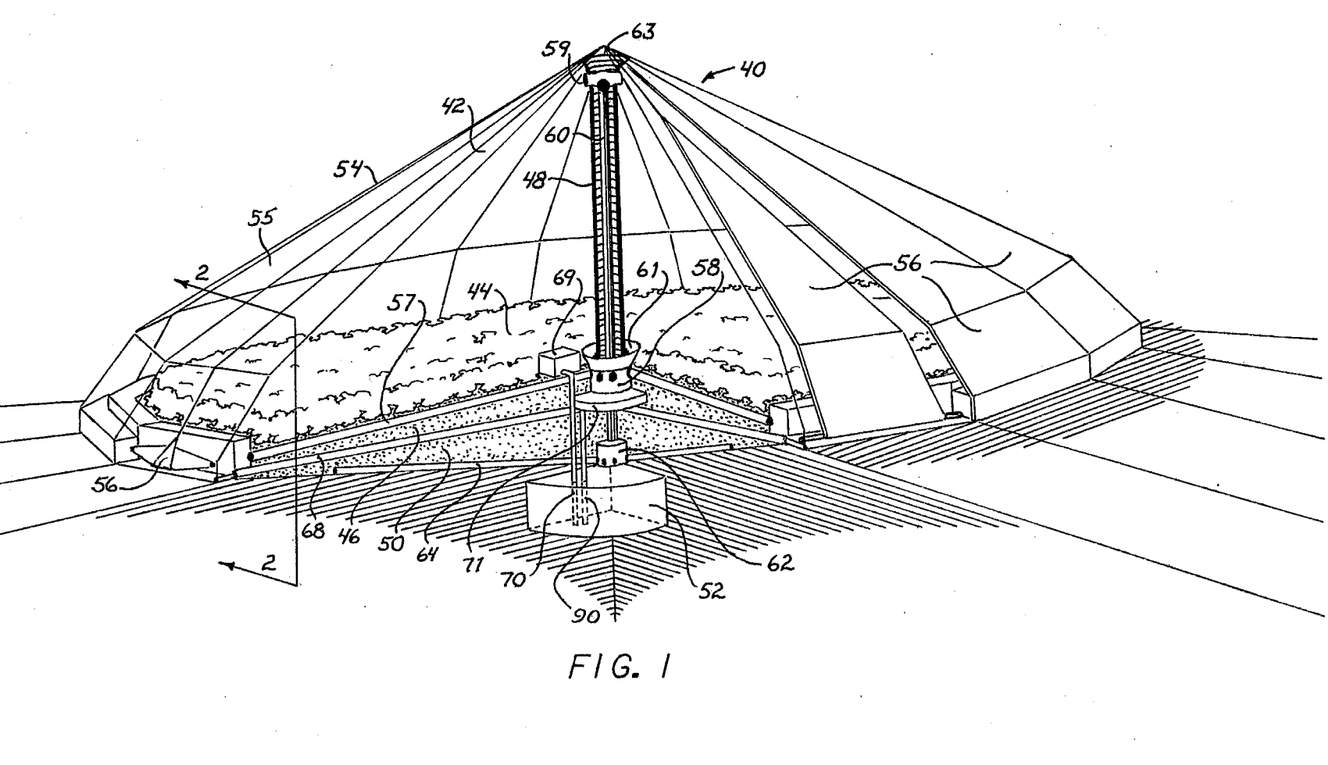
FIG. 1 is a perspective view of a greenhouse constructed in accordance with the present invention.
Figure 2:
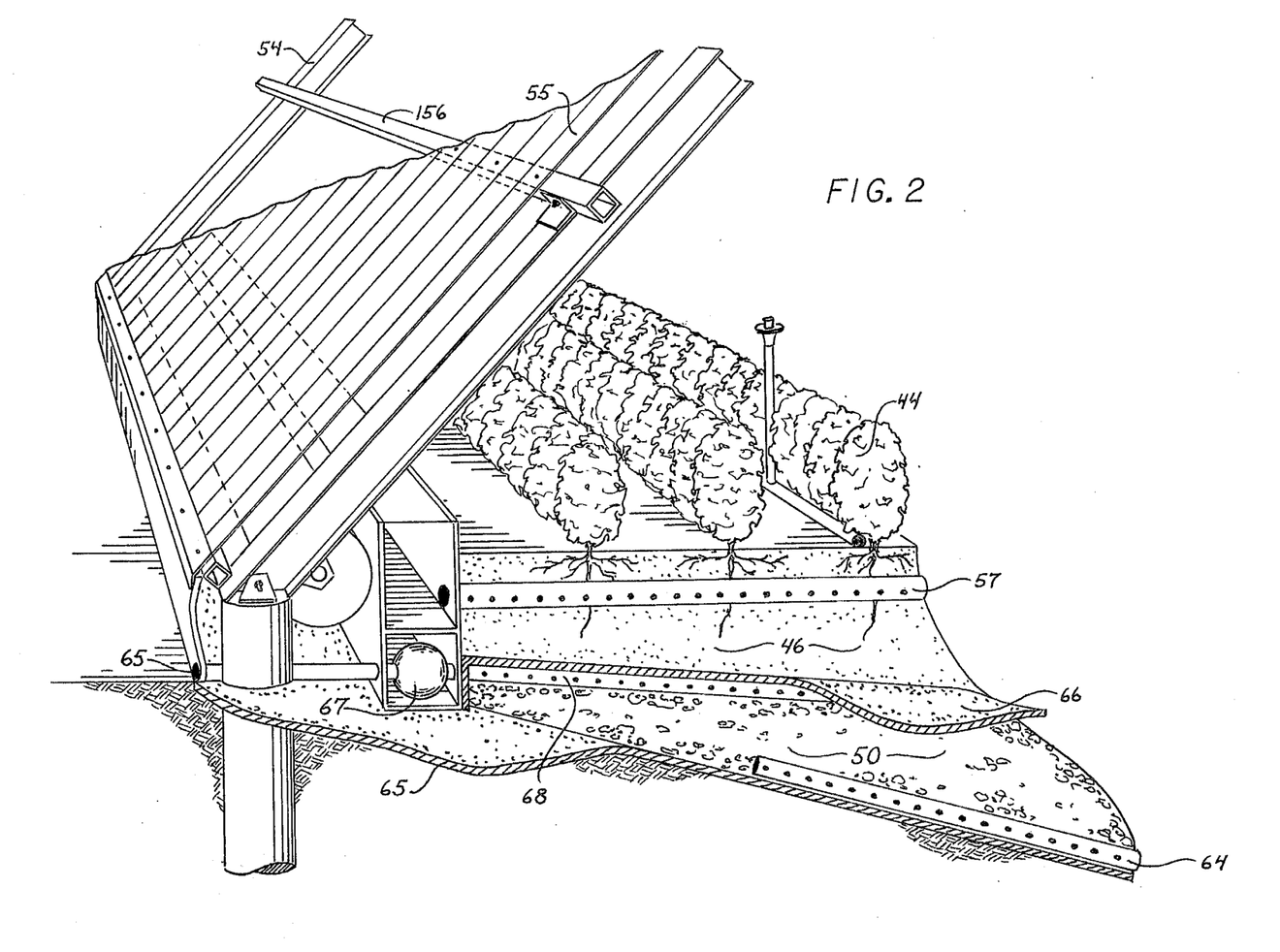
FIG. 2 is a perspective view of the greenhouse taken along section line 2—2 of FIG. 1.

Referring now to FIGS. 1 and 2 a solar greenhouse constructed in accordance with the present invention is shown and generally designated as 40. Generally stated the greenhouse 40 comprises, an outer enclosure 42 having translucent walls, a plurality of plants 44 adapted for growing in the greenhouse, a plant growing bed 46 for the plants within the greenhouse, a humidified air intake duct 48 for collecting humidified air produced by the plants, a condensation bed 50 in communication with the intake duct 48 for cooling the humidified air to absorb its energy and for condensing water vapor in the humidified air, and a condensate storage tank 52 for receiving and storing the liquid condensate formed in the condensation bed 50.

The outer enclosure 42 of the greenhouse 40 is a generally conical shape and is supported by a rigid framework 54. Translucent glass plates 55 or the like are attached to the framework 54 for enclosing the structure. The translucent enclosure 54 may be provided with a plurality of retractable insulating curtain assemblies 56 as shown in FIG. 1 for insulating the walls of the enclosure to prevent heat loss at night or on cloudy days.

The plants 44 within the greenhouse 40 may be of any type suitable for growing under greenhouse conditions such as for example tomato plants. Certain plants may be more solar absorptive than others but preferrably the plants 44 are fast growing and have a relatively large surface area and a dark color for absorbing a large portion of the solar radiation which enters the greenhouse. In the form of the invention shown the plants are illustrated as covering the entire floor area of the greenhouse 40. The greenhouse 40 may be provided with means for watering and supplying nutrients to the plants.

Depending on what plants are selected for growth, the growing bed 46 may be of any suitable growing medium such as organic soil, sand, vermiculite, or gravel. As shown in FIG. 2 a plurality of circulation ducts 57 are embedded in the growing bed 46 beneath the surface of the bed and are coupled to a circulation blower 58. The circulation ducts 57 are perforated with openings throughout their entire length. Circulation blower 58 has an intake 61 that draws air from the interior of greenhouse and circulates that air about the plants 44 and their roots. The circulation ducts 57 may be spaced throughout the growing bed 46 extending outward in a spoke like pattern from the circulation blower 58, which is located in approximately the center of the greenhouse 40. As shown in FIG. 2 in addition to being perforated throughout their length, the circulation ducts 57 also vent to the interior of the greenhouse.

Humidified air intake duct 48 of the greenhouse 40 is located approximately in the center of the greenhouse and extends from the apex of the greenhouse through the floor of the greenhouse to the condensation bed 50. The humidified air intake duct 48 is located to collect the hottest humidified air which is solar heated and thermally stratified within the greenhouse interior. The humidified air intake duct is provided with a plurality of intake openings 59 at the top of the structure in flow communication with the center of the duct 48. A humidified air blower 62 is coupled to the center of the duct for drawing heated humidified air from the interior of the greenhouse through the intake openings 59 into the duct 48. The humidified air blower 62 is in flow communication with the condensation bed 50 and vents the humidified air into the bed 50 where as will hereinafter be explained the vapor in the humidified air is condensed. In addition to the humidified air intake duct 48 an outside air intake duct 60 is provided to collect cool outside air through an outside air valve 63. Outside air intake duct 60 is located within the center of the humidified air intake duct 48 and is coupled to the circulation blower 58. Outside air can thus be drawn into the outside air intake duct 60 and circulated through the circulating ducts 57 in the growing bed and also around the plants for cooling the plants and greenhouse. In addition as will hereinafter be explained cool outside air may be circulated through the condensation bed for cooling purposes.

Condensation bed 50 of the greenhouse is a solid porous structure fabricated out of a material such as gravel or crushed rock. The bottom surface 64 of the condensation bed is supported by earth lined with an impervious membrane 65 and slopes downward towards the center of the greenhouse 40 into the condensate storage tank 52. As shown in FIG. 2 the condensation bed 50 is separated from the plant growing bed 46 by a water impervious membrane 66. A plurality of heat intake ducts 68 are embedded in the condensation bed 50 and are coupled to the circulating blower 58. The heat intake ducts 68 extend in a spoke like pattern from the circulation blower 58 and are perforated with openings along their entire length. In operation, heated air can be drawn from the condensation bed 50 into the heat intake ducts 68 by the circulation blower 58 and then forced through circulation ducts 57 in the growing bed and into the interior of the greenhouse 40 for heating the plant roots and greenhouse.

The condensate storage tank 52 is located below approximately the center of the greenhouse beneath the lower point of the condensation bed 50. The condensate storage tank 52 receives condensate directly from the condensation bed 50. The condensate storage tank also receives leached water from the growing bed through a conduit 90 which is situated in the center of the growing bed and is coupled to a water collection manifold 71 at the low point of the growing bed 46. Another conduit 70 extends from the condensate storage tank 52 to the level of the plants 44 and is coupled to a condensate pump 69 for pumping condensate from the condensate storage tank 52 for dispersion throughout the growing bed for heating the plant roots.

During the daylight hours of a sunny day the plants 44 of the greenhouse 40 collect solar radiation and produce humidified air by the process of evapotranspiration. This humidified air is then further heated by the sunlight and will thermally stratify to produce preheated air at the apex of the structure. Blower 62 is activated when this humidified air reaches a certain temperature and draws the air through the humidified air intake duct 48 and disperses it into the condensation bed 50. As will hereinafter be explained condensation bed 50 is always maintained at a temperature below the saturation point of the humidified air so that as the humidified air flows through the condensate bed the air is cooled and vapor in the air is condensed out. The condensate then flows by gravity into the condensate storage container 52. This process continues all day so that at the end of the daylight hours the condensation bed contains a relatively large quantity of heat and the condensate storage tank 52 contains a relative large quantity of hot liquid condensate water.

At night when there is a heat drain on the greenhouse humidified air blower 62 is deactivated and the circulation blower 58 is activated to draw heat from the condensation bed for heating the plants and greenhouse. Circulation blower 58 draws air through the heat intake ducts 68 within the condensation bed and the air is heated by the stored heat within the condensation bed. This heated air is then forced by the circulating blower 58 through the circulation ducts 57 in the growing bed through the growing bed and then to the interior of the greenhouse. The plants roots and greenhouse are thus heated by energy contained within the condensation bed. In addition condensate pump 69 may be activated for drawing hot condensate from condensate tank 52 for dispersion throughout the growing bed for further heating the plant roots.

If the heat loss from the greenhouse is minimal such that the energy in the condensation bed 50 cannot be depleted by heating the plants and greenhouse by an amount expected to be gained during the following day, then the outside air intake valve 63 will open for drawing cool night air through the outside air intake duct 60 into the condensation bed for cooling the bed. This air is then vented to the outside through a vent 65 coupled to the condensation bed. An automatic valve that is controlled simultaneously with air intake 63 controls the operation of the vent 65. Energy is thus be depleted from the condensation bed 50 by this cool air until its temperature drops to a suitable low point for the following days operation.

ALTERNATE EMBODIMENT

Figure 3:
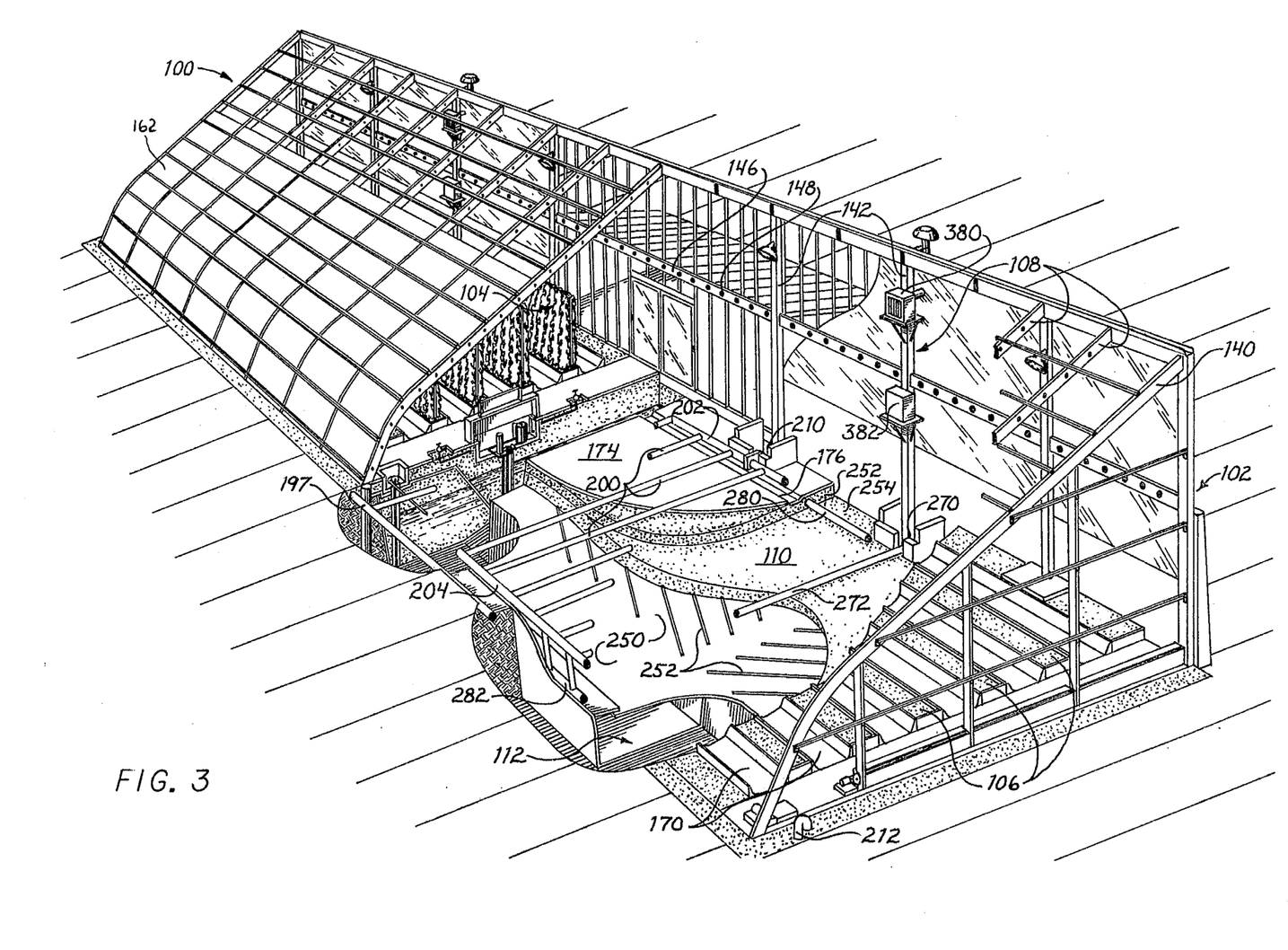
FIG. 3 is a perspective view of a greenhouse constructed in accordance with the present invention.

Referring now to FIG. 3 an alternate embodiment of a solar greenhouse constructed in accordance with the invention is shown and generally designated 100. This greenhouse 100 has essentially the same elements as the previously described greenhouse and generally stated comprises a support structure 102 for the greenhouse, a plurality of plants 104 adapted for growing within the greenhouse, a growing bed 106 for plants, a humidified air intake and preheating system 108 for collecting and heating humidified air produced by the plants in growing, a condensation bed 110 for cooling the collected humidified air and for condensing vapor within the humidified air, and a condensate storage tank 112 for receiving and storing the liquid condensate formed in the condensate bed.

STRUCTURE

Figure 4:
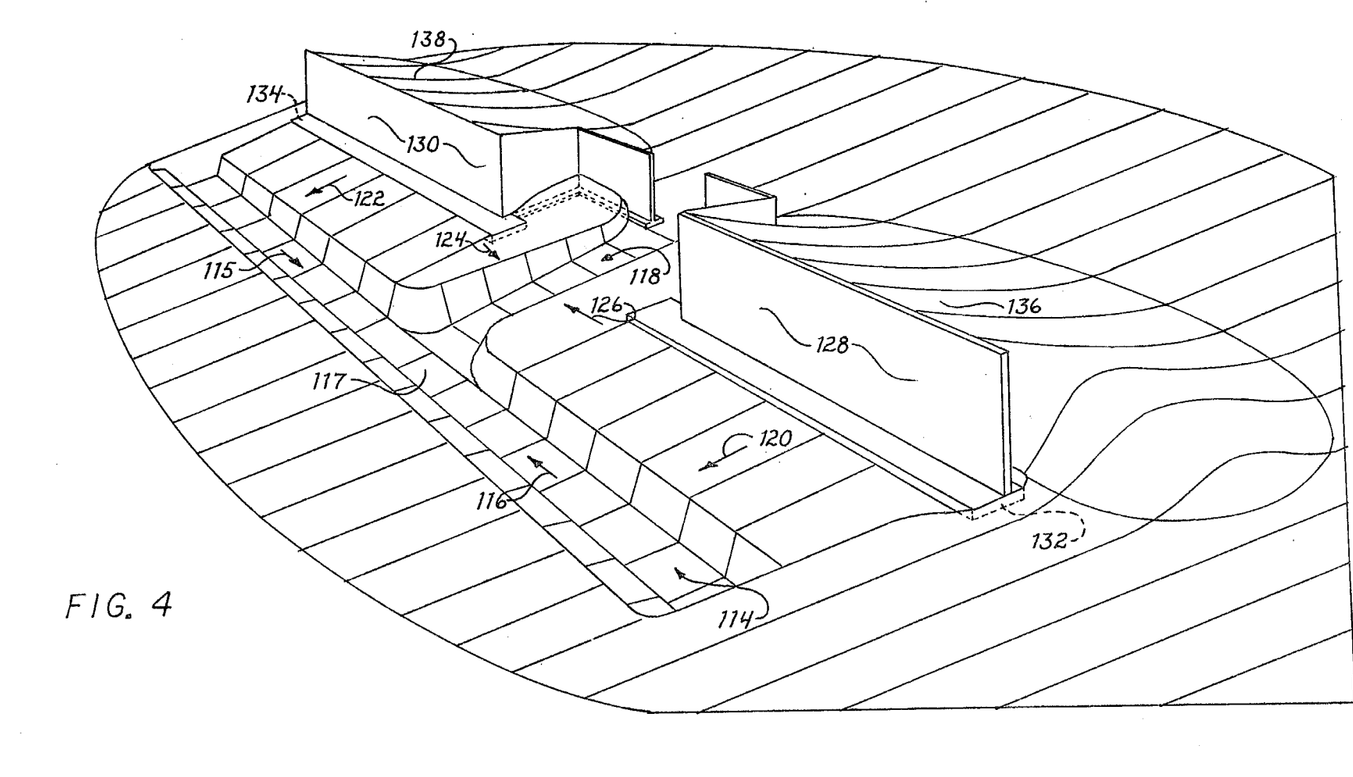
FIG. 4 is a perspective view of the ground excavation for the greenhouse of FIG. 3.

Prior to erecting the greenhouse, the ground is excavated as shown in FIG. 4. A condensate storage trench 114 is formed for the condensate storage tank 112. Condensate storage trench 114 extends lengthwise across what becomes the south side of the greenhouse 100 and slopes downward from each side of the greenhouse towards the center as indicated by arrows 115 and 116. A low area 117 is thus formed in the center of the trench 114. An irrigation water trench 118 is also formed approximately perpendicular to condensate storage trench 116 and as will hereinafter be explained supports a tank for receiving irrigation runoff water from the growing bed. Irrigation water trench 118 extends across the width of the building from what becomes the north wall of the building and slopes downward towards the condensate storage trench 116. Both trenches 114, 118 may be several feet deep depending on the tank capacities desired.

What becomes the subfloor of the structure is sloped downward as indicated by arrows 120, 122 towards the condensate storage trench 114. In addition the subfloor is sloped downward as indicated by arrows 124, 126 towards the irrigation water trench 118.

The north walls 128, 130 of the structure are formed opposite to the storage trench 114 and supported by concrete footings 132, 134 buried in the ground. If desired the north walls 128, 130 may be buttressed by backfill material 136, 138 from the trenches 114, 118.

Figures 5, 6, 7:
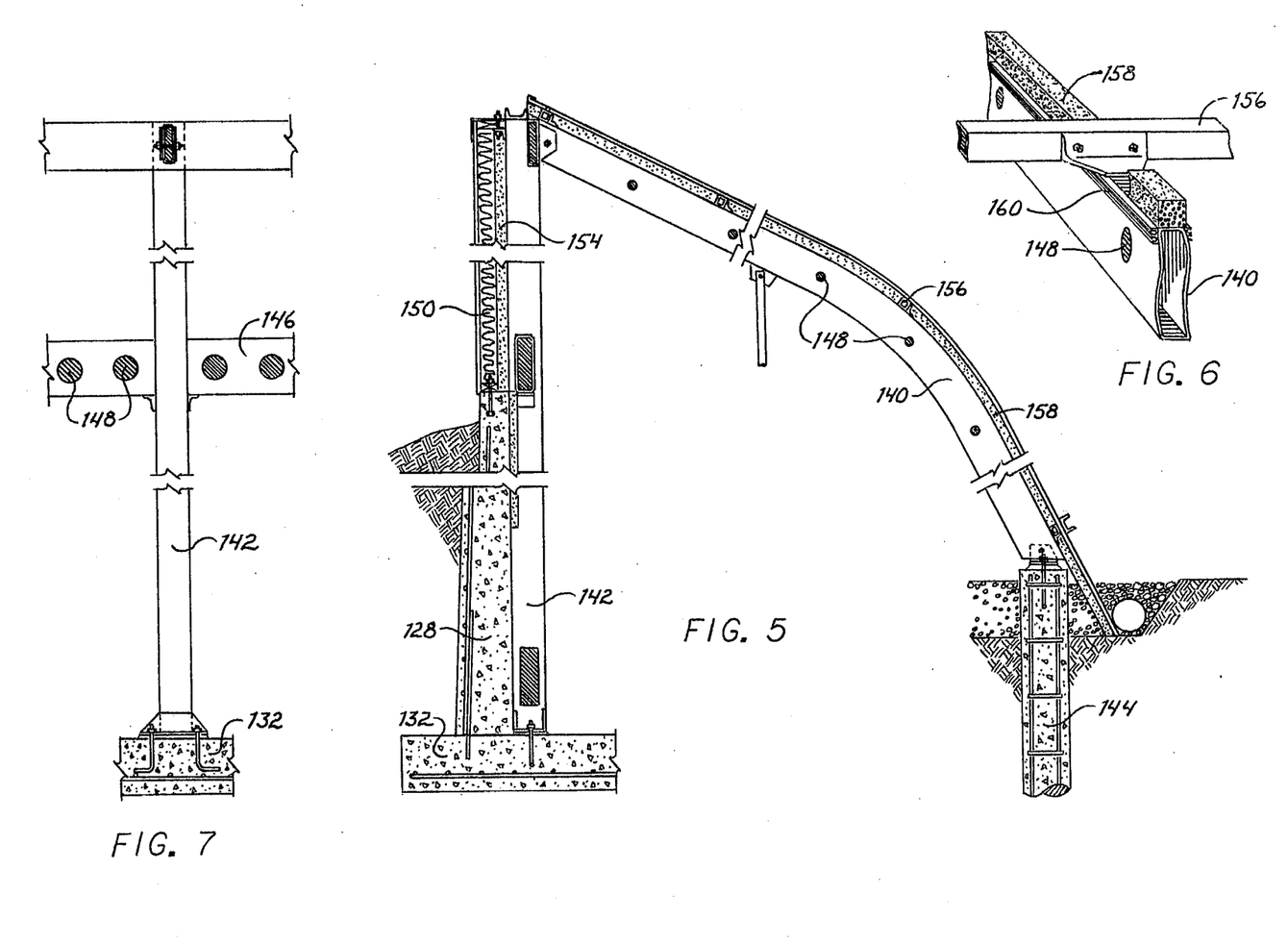
FIG. 5 is a cross sectional view of a portion of the structure of the greenhouse of FIG. 3.
FIG. 6 is a detail view of a structural connection for the greenhouse.
FIG. 7 is a cross sectional elevation view of a portion of the structure of the greenhouse.

Referring now to FIGS. 5, 6, and 7 typical detail sections for the structural members of the greenhouse are shown. All structural members are preferrably steel or aluminum rectangular tubing. As will hereinafter be explained the structure members are interconnected to form conduits for air conduction within the structure. In addition all structural members are painted or coated black for solar absorption and humidified air preheating within the structure.

The main rafters 140 of the greenhouse extend across the width of the greenhouse in a north south direction and are attached at one end to vertical support columns 142 attached to the north walls 128, 130 and at the other end to concrete footings 144 buried along the south edge of the structure. Cross support members 146 are attached to the vertical support columns 142 and along with the other main structural members are perforated with inlet openings 148 along their entire length for circulating humidified air within the interior of the greenhouse.

The upper portion of the north walls 128, 130 are wood framed with 2×4 studs 150 spaced on 2 foot centers. The area between the studs is insulated and covered with siding material. In addition rigid polystyrene insulation 154 is placed adjacent the interior of the greenhouse and has a reflecting outer surface which faces the interior of the greenhouse.

As shown in FIG. 6 a plurality of parallel spaced purlins 156 are attached to the main rafters 140 and extend across the entire length of the structure. Extruded polystyrene batts 158 are attached to the main rafters 140 between the purlins 156 to insulate the rafters. In addition, as shown in FIG. 6, guide tracks 160 for the curtain assemblies are attached to the main rafters 140.

The roof and sides of the structure are enclosed by translucent glass or plastic plates 162 (FIG. 1) attached to the purlins 156. As shown in FIG. 3 the roof of the greenhouse is sloped at an angle such that light reflected from the north walls 128, 130 will allow maximum exposure of the plants to sunlight during the shortest growing days of the season.

PLANTS AND GROWING BED

Figure 8:
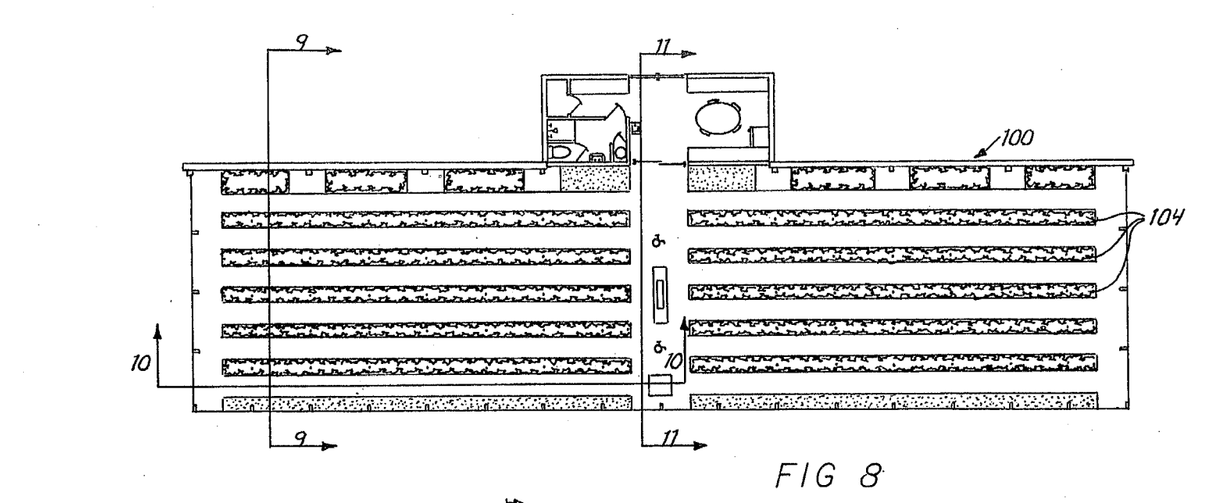
FIG. 8 is a plan view of the interior of the greenhouse.
Figure 9:
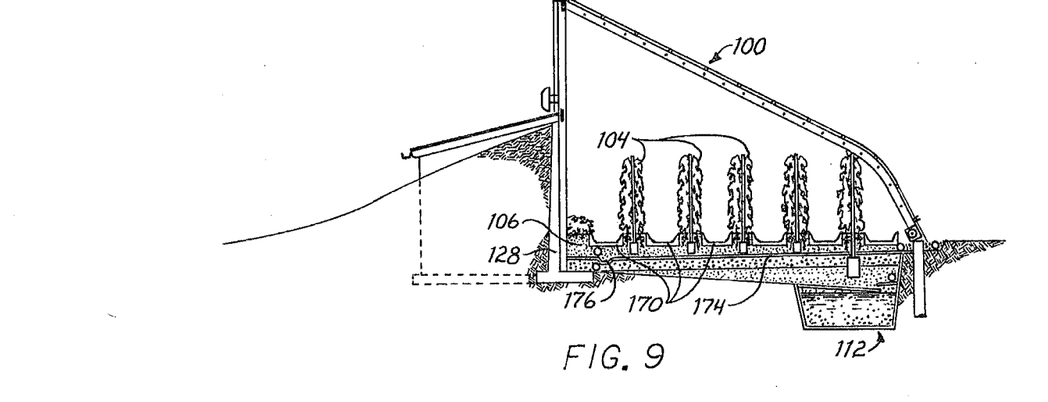
FIG. 9 is a cross sectional elevation view of the greenhouse taken along section line 9—9 of FIG. 8.
Figure 10:
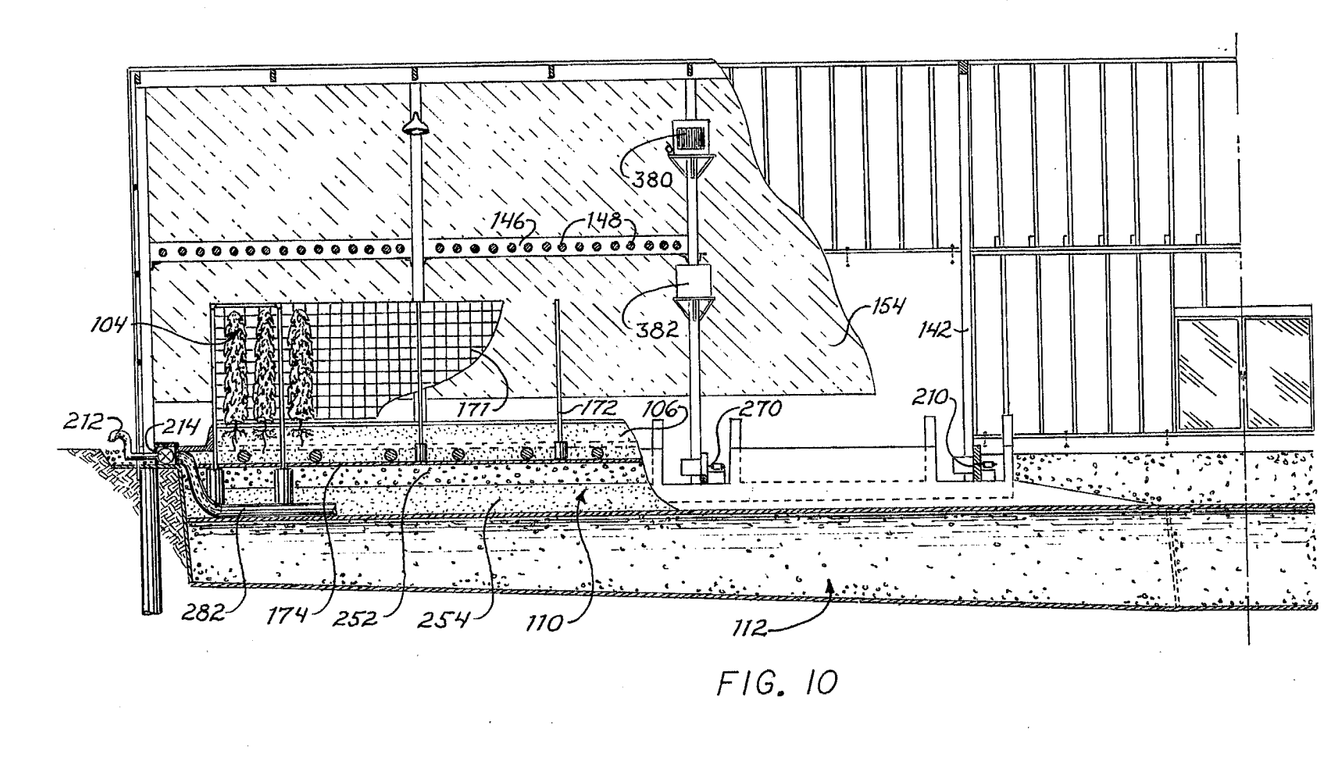
FIG. 10 is a cross sectional elevation view of the greenhouse taken along section line 10—10 of FIG. 8.

Referring now to FIGS. 8, 9, and 10 the arrangement of the plants 104 for the greenhouse is shown. As previously stated, the plants may be of any type suitable for growing in a greenhouse. In the form of the invention shown, the plants are tomato plants. As shown in FIG. 8 the plants 104 are arranged in parallel spaced rows that extend lengthwise in an east west direction across the greenhouse. Parallel spaced precast concrete channel members 170 (FIG. 9) are embedded in the plant growing bed 106 to form walkways for the workers between the rows of plants. The plants 104 are supported for growth by a support mesh 171 (FIG. 10) attached to vertical supports 172 supported by concrete blocks embedded in the growing bed 106.

The growing bed 106 for the plants may be any suitable media such as soil, sand or gravel. The growing bed 106 has a thickness of several inches and as shown in FIG. 9 has a bottom surface 174 that slopes downward towards the north walls 128, 130 of the greenhouse. The bottom surface 174 of the growing bed 106 is water impervious and is insulated to inhibit heat flow from the condensation bed 110 to the growing bed. The thickness and type of insulation may be selected to inhibit heat flow from the condensation bed to the growing bed at a controlled rate. The bottom surface may be formed from a bottom layer of insulating material such as sprayed polyurethane and a top layer of water impervious material such as polyethylene film. A water collection trough 176 (FIG. 9) is formed in the bottom surface of the growing bed and extends lengthwise across the north side of the bed. The water collection trough 176 slopes downward through the the center of the greenhouse and empties into an irrigation water tank 178 (FIG. 11) formed in trench 118 of the greenhouse excavation.

Figure 11:
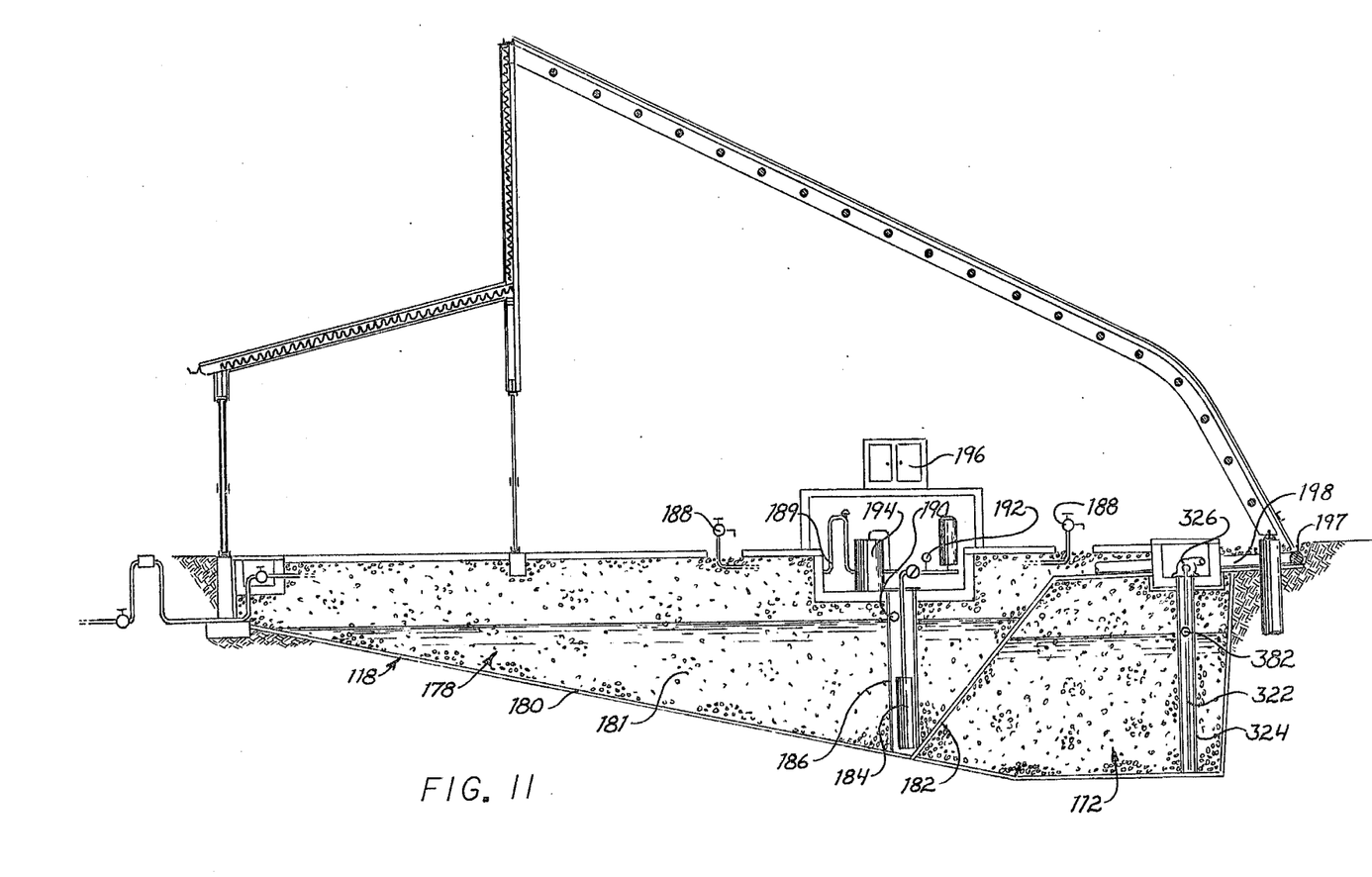
FIG. 11 is a cross sectional elevation view through the greenhouse taken along section line 11—11 of FIG. 8.

Referring now to FIG. 11 the irrigation water tank 178 is formed by depositing solid porous material such as crushed rock 181 on a water impervious lining 180 within the excavated trench 118. The irrigation water tank 178 is separated from the condensate storage tank by another impervious and insulated barrier 182.

A submersible pump 184 is mounted in a perforated tube 186 within the irrigation water tank 178 for pumping water from the tank 178 to spigot outlets 188 and to an automatic plant watering system 189. The output of the pump 184 is controlled by a conventional float valve 190 pressure regulator 192 and valving arrangement. The discharge from the pump 184 may be coupled to a nutrient tank 194 for mixing the irrigation water with plant nutrients. All of these components are housed within a control box 196 in the greenhouse.

As shown in FIG. 11 a rain water collection duct 197 is buried several inches below ground level along the outside perimeter of the greenhouse and is perforated with inlet openings along its entire length for collecting rain water. The rain water collection duct 197 is coupled to a conduit 198 for directing the collected rain water into the irrigation water tank 178 for adding rain water to the system.

Figure 14:
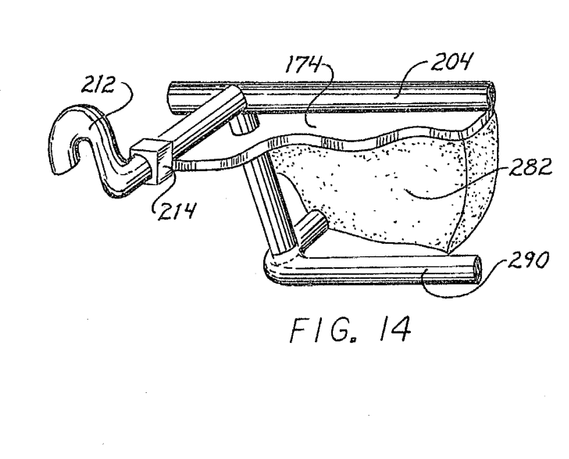
FIG. 14 is a detail view of an alternate embodiment for the condensation bed exhaust.

Referring again to FIG. 3 a network of interconnected circulation ducts 200 are buried within the plant growing bed 106 below the surface of the bed for circulating air around the root system of the plants. Circulation ducts 200 extend in a north south direction across the width of the greenhouse and are dispersed throughout the growing bed in a spaced parallel array. The circulation ducts 200 are perforated with spaced openings throughout their entire length and are connected at the north end of the greenhouse to a lengthwise running inlet header 202 and at the south end of the structure to a lengthwise running outlet header 204. The inlet header 202 of the circulation ducts 200 is coupled to four electrically powered circulation blowers 210 (FIG. 10) located within the greenhouse along four alternate vertical support columns 142 of the greenhouse support structure. Each circulation blower 210 is coupled to the interior of a support column 142 and, as will hereinafter be explained, is able to draw outside air through an inlet valve on the column for circulation through the circulation ducts 200 for cooling the plants roots. As shown in FIG. 10 outlet header 204 of the circulation ducts 200 is vented through a vent 210 to the atmosphere. Air flow through the vent 212 is controlled by an automatic shut-off valve 214 as shown in FIG. 14.

CONDENSATION BED AND HUMIDIFIED AIR PREHEATING SYSTEM

Referring again to FIG. 3 the condensation bed 110 and the humidified air intake and preheating system 108 are shown. In the form of the invention shown, the condensation bed 110 is situated on the floor of the excavation supported by earth and is located directly below the plant growing bed 106 separated from the growing bed by the insulated water impervious bottom surface 174 of the growing bed. The condensation bed 110 generally stated comprises a water impervious bottom surface 250, and two layers of crushed rock 252 and 254 of varying size.

Figure 15:
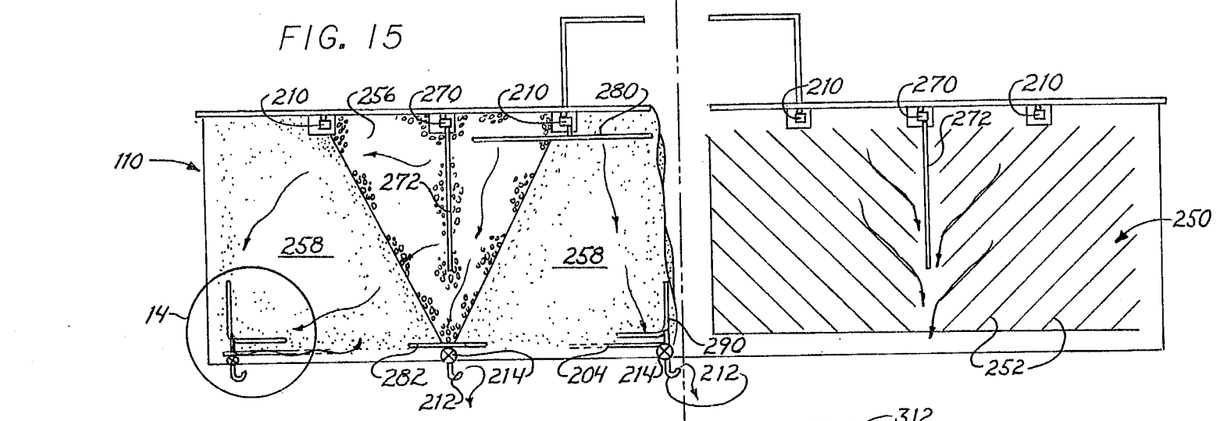
FIG. 15 is plan view of an alternate embodiment of the condensation bed.
Figures 16, 17:
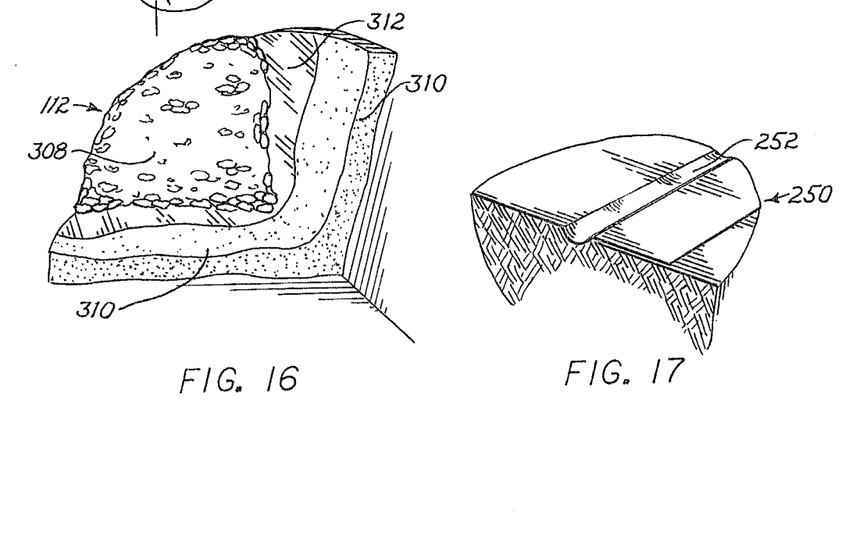
FIG. 16 is a cross sectional view of an alternate construction for the condensate storage tank.
FIG. 17 is a detail view of the bottom surface of the condensation bed.

Referring now to FIGS. 3 and 17 the construction of the bottom surface 250 of the condensation bed is shown. To form the bottom surface 250 a water impervious material such as polyethylene film may be laid across the subfloor of the excavation. Guide channels 252 may be formed in the earth beneath the polyethylene film for directing the flow of condensate into the condensation storage tank 112. As shown in FIG. 3 and FIG. 15 the guide channels may be arranged in parallel spaced rows that extend obliquely across the width of the greenhouse to converge the flow of condensate towards the condensate storage tank 112.

The two rock layers 252 and 254 of the condensation bed 110 are placed on top of the bottom surface 250 of the bed. In the form of the invention shown the uppermost layer 252 may be relatively large sized crushed rock such as 1½" washed gravel and the lowermost layer 252 may be relatively small sized crushed rock such as pea gravel. The smaller size rock will generally absorb heat more quickly than the larger rock but the larger sized uppermost layer 252 is provided to equally distribute the humidified air flow before it reaches the smaller sized lower layer 252. Alternately the condensation bed may be constructed as shown in FIG. 15 with the large sized rock 256 arranged in a generally triangular shaped layer adjacent a humidified air duct 272 and the smaller sized rock disposed along the outside edges of the bed. With this arrangement the humidified air will again be dispersed by the larger rock before entering the smaller sized and more heat absorbant rock 258.

The humidified air intake and preheating system of the invention generally stated comprises two humidified air blowers 270 (FIG. 10) coupled to the interior of two vertical support columns 142 on the support structure and two humidified air ducts 272 embedded in the condensation bed 110 and coupled to the heating blowers 270.

The humidified air blowers 270 are electrically operated blowers that are adapted to intake humidified air from the interior of the greenhouse and force the air through the humidified air ducts 272 into the condensation bed 110. Since all of the main structural members of the greenhouse are coupled together for air flow, the humidified air blowers 270 draw humidified air from the greenhouse through the inlet openings 148 in the main structural members 140 and 146 into the vertical support columns 142 and force the air through the humidified air ducts 272. The humidified air ducts 272 are perforated with openings along their entire length so that the humidified air forced through the ducts 272 by the blowers 270 is dispersed into the condensation bed. In the form of the condensation bed 110 shown in FIG. 1 the humidified air ducts 272 are buried in the first layer of larger sized rock 254 and the humidified air flows through the first layer 252 where it is evenly dispersed and then through the second layer 252 of smaller sized crushed rock where most of the heat is absorbed. In the alternate form of the condensation bed shown in FIG. 15 humidified air flow is through the larger sized rock 256 and then outward through the smaller sized rock 256.

For cooling the condensation bed a cooling inlet duct 280 and a cooling exhaust duct 282 as shown in FIG. 15, are provided. There are four cooling inlet ducts 280 that run in a generally east west direction along the north side of the condensation bed and are embedded in the rock of the bed. Each cooling duct 280 is perforated with openings along its entire length and is coupled to a circulation blower 210 (FIG. 10) for blowing cool air through the condensate bed whenever the bed requires cooling. The cooling exhaust duct 282 runs in a generally east west direction across the south side of the bed. The cooling exhaust duct 282 is perforated with openings along its entire length and is coupled to the exhaust conduits 204 of the growing bed circulation ducts 200 for exhausting the warmest air in the condensate bed. In an alternate arrangement shown in FIGS. 14 and 15 there may be several perforated cooling ducts 290 arranged throughout the condensate bed as shown coupled to the exhaust header 204 of the growing bed.

CONDENSATE STORAGE TANK

Figure 12:
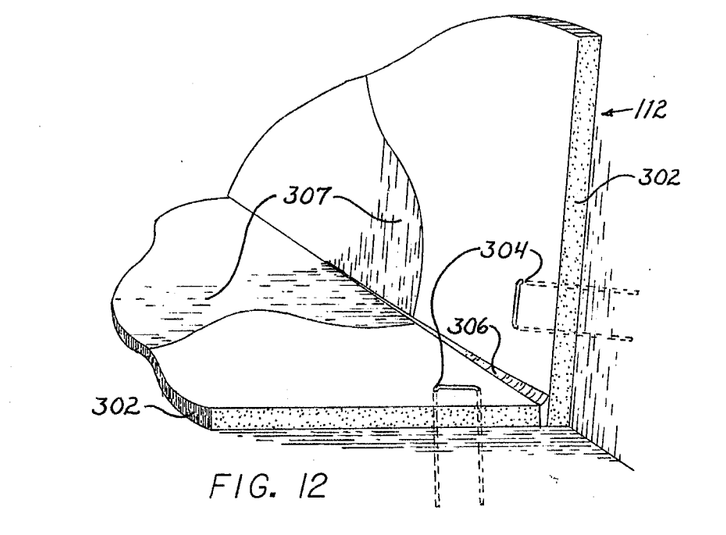
FIG. 12 is a cross sectional perspective view showing the construction of the condensate storage tank.
Figure 13:
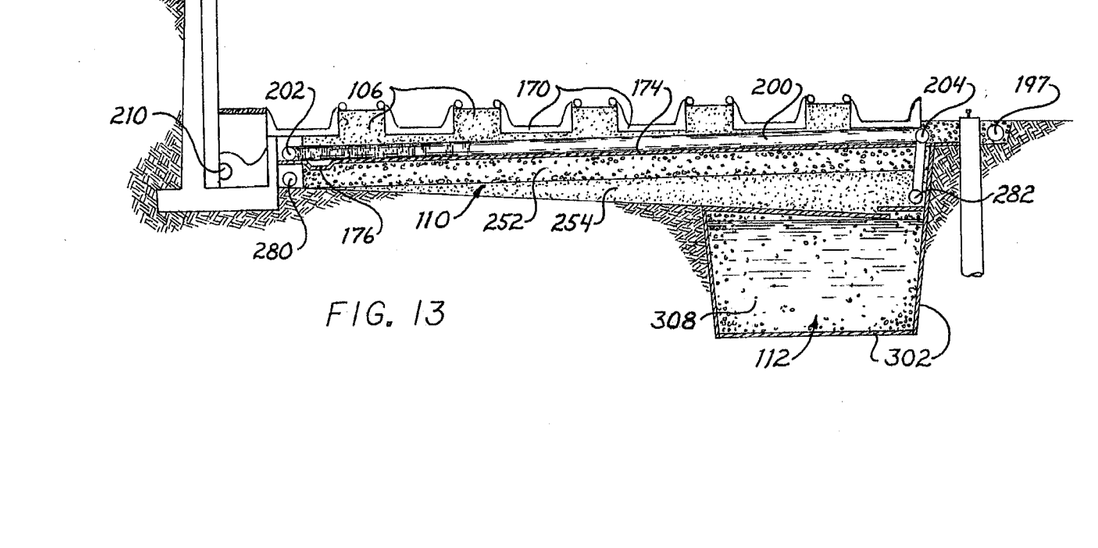
FIG. 13 is a cross section showing the construction of the condensate storage tank.

The condensate storage tank 112 is formed in trench 116 of the excavation and runs in a generally east west direction along the south side of the structure and is situated beneath the bottom surface 250 of the condensate bed to collect hot condensate from the bed. Referring now to FIGS. 12 and 13 the construction of the condensate storage tank 112 is shown. To construct the rank 112, a water impervious lining 302 such as polystyrene plastic is attached to the earth walls of the excavated condensate storage trench 114 utilizing staple like fasteners 304. The cracks between adjacent surfaces can then be filled with a sealer material 306 such as grout which may be further sealed with an acrylic or vinyl coating 307. The tank 112 is then filled with a solid porous material such as crushed rock or gravel 308.

An alternate construction for the tank is shown in FIG. 16. In this embodiment polyurethane plastic material is sprayed in a layer 310 on the earth walls of the excavated trench 114 and may then be sealed with a layer of waterproof acrylic 312.

As shown in FIG. 11 for pumping condensate water from the condensate storage tank 112 a pump 320 is coupled through a conduit 322 to the interior of the tank 112. Conduit 322 is situated to collect water from the bottom of the tank 112 and may be housed in a perforated casing 324 within the tank 112. A conventional float valve 328 may be utilized to control the operation of the pump 320. The output of the condensate pump 320 may be coupled to water spigots throughout the greenhouse so that hot condensate may be pumped from the condensate tank 112 and dispersed through the growing bed 106 for heating the plants roots.

CURTAINS AND BACK-UP SYSTEM

Figures 18, 19:
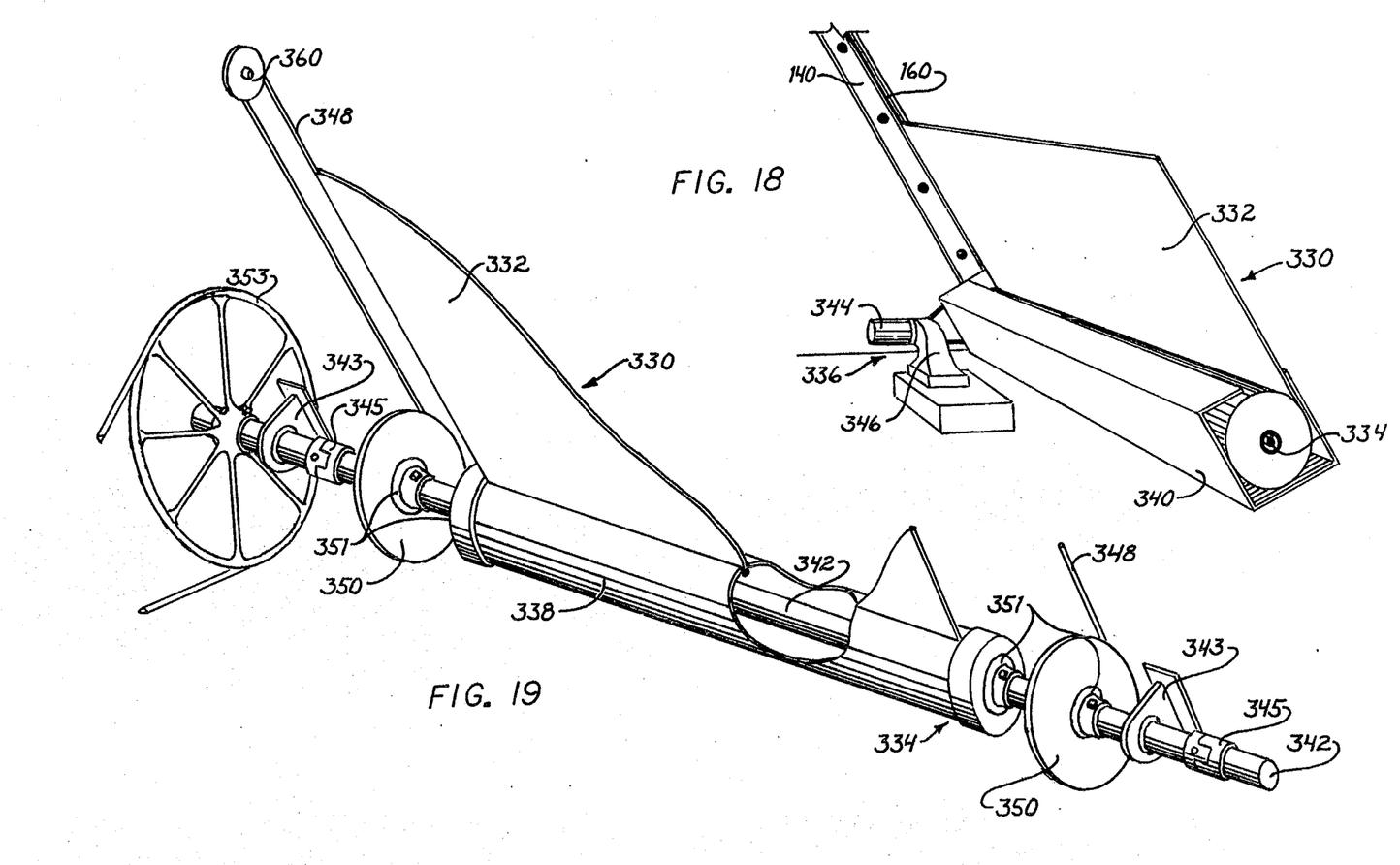
FIG. 18 is a perspective view of a portion of the curtain assembly of the invention.
FIG. 19 is a partially exploded view of the curtain assembly.

Referring now to FIG. 18 an automatic curtain assembly 320 is provided for insulating the translucent walls of the greenhouse during periods of high heat loss or for reflecting sunlight during periods of high heat gain. Curtain assembly 330 generally comprises a plurality of curtains 332 for covering the translucent walls of the greenhouse with each curtain 330 mounted to a rotatable roller assembly 334 for winding and unwinding thereon, and a drive arrangement 336 for raising and lowering the curtains over the translucent walls of the greenhouse.

The curtains 332 may be fabricated from any suitable heat insulating material capable of being wound and unwound around the roller assembly 334. Each roller assembly 334 is rotatably mounted on hollow shafts 338 which are rotatably mounted to a main drive shaft 342 through ratchet assemblies 351 such that rotation of the roller assembly 334 and curtains is free in one direction and coupled to the rotation of the drive shaft 342 in the reverse direction. As shown in FIG. 18 the roller assemblies 334 are housed in enclosures 340.

The drive arrangement FIG. 19 for the curtains 332 comprises the main shaft 342 rotatably mounted within hollow curtain shafts 338, a drive motor 344 and reducer 346 for the drive shaft, and drive cables 348 supported on the guide tracks 160 on the rafters 140 and attached at one end to the cable drive pulleys 350 mounted to the drive shaft 342 and at the other end to the edge of the curtains 332 at either end.

Drive shaft 342 is driven by the output of the motor 344 and reducer 346 through a belt 352 and pulleys (not shown) attached to the reducer output and drive shaft 342 respectively. As shown in FIG. 19 in addition to being guided by guide tracks 160 drive cable 348 is supported near the apex of the greenhouse by a freely rotatably mounted pulley 360. Rotation of the drive shaft 342 by the motor drives the drive cable pulleys 350 on the driveshaft 342, which in turn winds or unwinds the drive cable on the drive pulleys 350 and raises or lowers the curtains 332.

OPERATION

Figure 20:
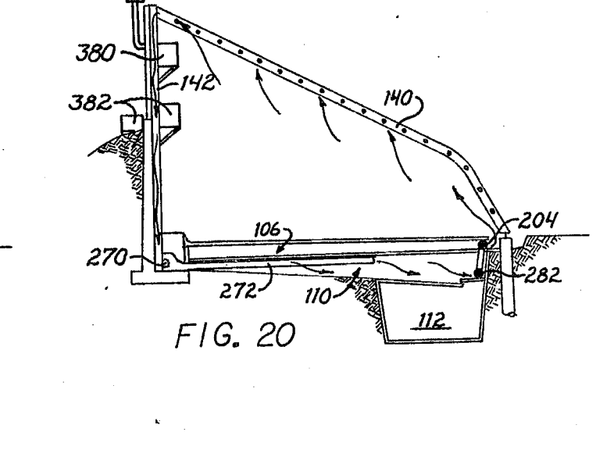
FIG. 20 is a cross sectional elevation view taken along section line 20—20 of FIG. 22 showing the humidified air and condensation flow during daylight operation of the greenhouse.
Figure 21:
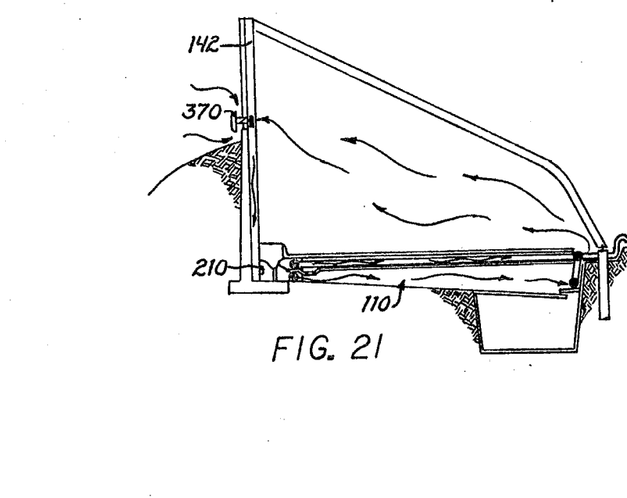
FIG. 21 is a cross section elevation view taken along section line 21—21 of FIG. 22 showing air flow for cooling the condensate and growing beds of the greenhouse.
Figure 22:
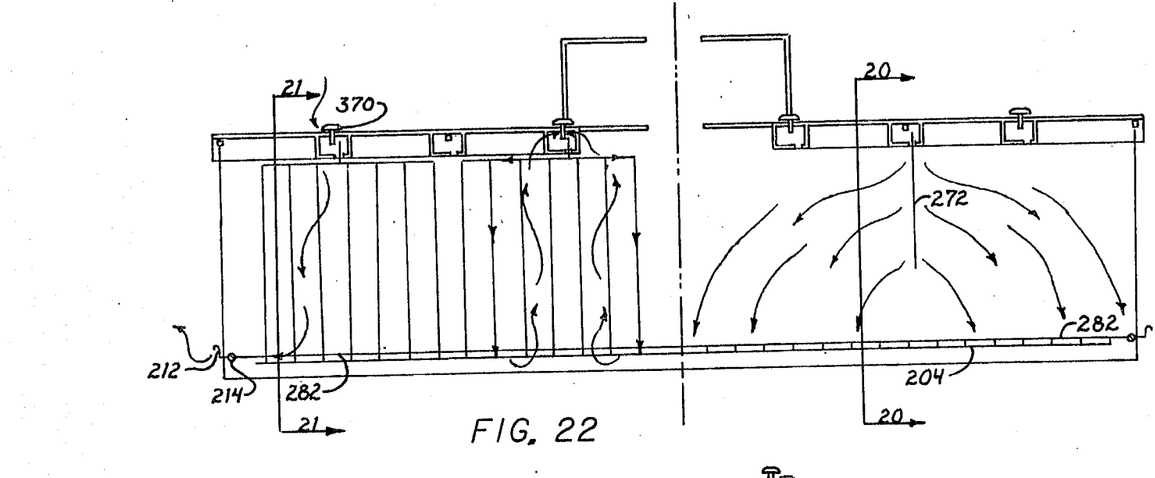
FIG. 22 is a plan view in two sections showing the condensation and cooling cycles illustrated in FIGS. 20 and 21.

Referring now to FIGS. 20, 21 and 22, in operation during a sunny day the plants 104 continuously absorb solar radiation and produce humidified air by the process of evapotranspiration. This humidified air is continuously drawn by the two humidified air blowers 270 into the inlet openings 148 within the main structural members 140 and 146. This humidified air is then drawn through the structural members and into the vertical support columns 142 to which the blowers 270 are coupled. Since the structural members are black they act as solar absorbers and the humidified air is preheated as it flows through the structural members. As shown in FIG. 20 this humidified air is then forced through the humidified air ducts 272 in the condensation bed 110 and through the perforated openings in the ducts 272 into the condensation 110 itself. As heated humidified air enters the relatively cool condensation bed 110 the air is cooled and condensate forms. As shown on the right portion of FIG. 22 the air flows to the exhaust duct 282 of the condensation bed which is in communication with the outlet header 204 where the air reenters the greenhouse. The hot condensate formed in the condensation bed 110 will flow by gravity to the condensate storage tank 250.

This process of humidified air formation and condensation continues throughout the daylight hours so that when night arrives the condensation bed is at a relatively high temperature and the condensate storage tank 112 has a relatively large quantity of hot condensate contained therein. At night when there is a heat loss from the greenhouse heat continuously flows by conduction from the condensation bed 110 into the growing bed 106 to keep the plants at an optimal growing temperature. In addition hot condensate may be withdrawn from the condensate storage tank 112 and dispersed throughout the growing bed 106 for watering and further heating the plant roots. This water then passes though the growing bed 106 and into the irrigation water tank 118 where it can be reused as required.

Ideally the energy within the condensation bed 110 is depleted each night by heat flow to the growing bed 106 by an amount that will be gained on the following sunny day. The condensation bed will thus cool enough to condense the vapor in the humidified air formed on the following day. This operation should maintain cool temperatures at the plant level as they will be in a continual state of evaporative cooling, and all thermal energy will be absorbed into the condensation bed 110. If the condensation bed however, is not cooled sufficiently by heat loss to the growing bed it may be cooled as illustrated in FIG. 21 and in the left half of FIG. 22. For cooling the condensation bed 110 the circulation blowers 210 may be activated. This draws cool night time air through the inlet vents 370 into the vertical support columns 142 to which the circulation blowers 210 are coupled. This cool air is then forced by the blower 210 through the cooling inlet ducts 280 in the condensation bed, through the condensation bed, through outlet ducts 282 and automatic valve 214 and exhaust duct 204, and then to the outside atmosphere. This cycle may be continued until the condensation bed is cooled enough to operate satisfactorily on the following day. In addition to cooling the condensation bed the circulation blowers 210 also force cool air through the circulation ducts 200 in the growing bed and out the exhaust ducts 212 to the atmosphere for cooling the plants roots.

As back up systems for the cooling and heating cycles of the greenhouse, conventional heating 380 (FIG. 20) and air conditioning 382 apparatus may be coupled to the humidified air blowers 270 and activated as required. The back up air conditioning 382 apparatus is used in communication with condensation bed 110. If cool outside air is insufficient to deplete the heat contained therein, then the air conditioning apparatus will be used to lower the temperature of the condensation bed 110 to that required for heat absorption during the next sunny day. In addition the insulating curtains may be raised or lowered as required.

While the presently preferred embodiment of the invention involves a greenhouse and a method and apparatus for collecting and storing solar energy for use in the greenhouse, it is contemplated that certain of the inventive concepts may be advantageously utilized in other greenhouse embodiments and solar energy collection systems. In addition while plants have been disclosed as the primary solar energy absorbers and converters in the preferred embodiments of the invention it is to be understood that passive solar absorbers such as dark soil or collector plates may be utilized alone or in combinaiton with plants to produce water vapor and humidified air. Thus it is intended that alternative embodiments and modifications of the inventive concepts be included within the scope of the appended claims, except insofar as limited by the prior art.

What is claimed is:

1. Solar heating apparatus comprising:
   an air filled enclosure adapted for light transmission therethrough;
   a plurality of plants adapted for growing within the enclosure and for producing humidified air within the enclosure by a process of evapotranspiration;
   means for supplying liquid water to the plants;
   means for collecting the humidified air;
   means for cooling the humidified air and for condensing water vapor within the humidified air to liquid condensate;
   means for storing the heat extracted from the humidified air by the cooling means; and
   means for extracting for heat from the storing means for use.

2. Solar heating apparatus as defined in claim 1 and further comprising means for heating the humidified air with solar radiation before cooling the humidified air and condensing the vapor within the humidified air.

3. Solar heating apparatus as defined in claim 2 and wherein the cooling means and storing means comprise a rock bed wherein the humidified air may be dispersed and cooled and the extracted energy stored.

4. Solar heating apparatus as defined in claim 3 and further comprising means for storing the liquid condensate and means for dispersing the condensate over the plant roots for heating the plants.

5. Solar heating apparatus as defined in claim 4 and wherein the condensate storing means comprises a condensate storage tank adapted to collect condensate liquid runoff from the rock bed.

6. A solar greenhouse comprising:
an air filled enclosure adapted for light transmission therethrough;
means mounted within the enclosure for absorbing solar radiation for forming humidified air within the enclosure including a plurality of plants adapted for growing within the enclosure in a growing bed,
means for collecting the humidified air;
means for cooling the humidified air and for condensing water vapor within the humidified air to liquid condensate;
means for storing the condensate;
means for selectively dispersing stored condensate into the growing bed for heating the plants;
means for selectively extracting heat from the cooling and condensing means for heating the greenhouse and plants during periods of heat loss from the greenhouse, and
means for selectively extracting heat from the cooling and condensing means during periods of heat gain to the greenhouse.

7. The greenhouse as defined in claim 6 and further comprising means for heating the humidified air with solar radiation.

8. The greenhouse as defined in claim 6 and wherein the humidified air collection means comprises a blower coupled to a duct system for collecting and transporting the humidified air to the cooling and condensing means.

9. The greenhouse as defined in claim 8 and wherein the duct system is painted black to absorb solar radiation and heat the humidified air.

10. The greenhouse as defined in claim 9 and wherein the duct system is formed from a support structure of the greenhouse having hollow structural members coupled together for air flow through the members.

11. The greenhouse as defined in claim 8 and wherein the cooling and condensing means comprises a bed formed from rock with the bed coupled to the duct system such that the humidified air may be dispersed through the bed and cooled.

12. The greenhouse as defined in claim 11 and wherein the cooling and condensing bed is situated beneath the growing bed for the plants and is insulated from the growing bed by a thermal insulation barrier constructed to inhibit heat flow from the condensing bed to the growing bed at a controlled rate.

13. The greenhouse as defined in claim 12 and wherein the condensate storage means comprises a storage tank adapted to collect liquid condensate from the cooling and condensing bed.

14. The greenhouse as defined in claim 13 and wherein the means for extracting heat from the cooling and condensing bed during periods of heat gain is a cooling duct system embedded within the cooling and condensing bed and coupled to a cooling blower and adapted to circulate and exhaust cool air through the cooling and condensing bed.

15. A solar greenhouse comprising:
an enclosed air filled structure adapted to admit solar radiation;
means for growing plants within the structure including a growing bed for supporting the plants roots;
a plurality of plants adapted for growing in the growing bed and for producing heat laden humidified air through a process of evapotranspiration;
a condensation bed comprising a layer of rock for cooling the humidified air and for condensing vapor within the humidified air;
means for collecting the humidified air and for forcing the humidified air through the condensation bed;
a condensate storage tank coupled to the condensation bed for collecting liquid condensate formed in the condensation bed;
means for selectively extracting condensate from the storage tank and for dispersing the condensate in the growing bed for heating the plants roots;
means for selectively extracting heat from the condensation bed for heating the plants and greenhouse; and
means for selectively cooling the condensation bed.

16. The solar greenhouse as defined in claim 15 and wherein the means for extracting heat from the condensation bed to the growing bed comprises locating the condensation bed directly beneath the growing bed and separating the condensation bed from growing bed by an insulating layer constructed to inhibit heat flow from the condensation bed to the growing bed at a controlled rate.

17. The solar greenhouse as defined in claim 16 and wherein the means for cooling the condensation bed comprises a cooling duct system embedded in the condensation bed coupled to a cooling blower adapted to circulate cool air through the condensation bed.

18. The solar greenhouse as defined in claim 17 and wherein the means for collecting the humidified air comprises a humidified air blower coupled to a humidified air duct system located to collect humidified air within the greenhouse.

19. The solar greenhouse as defined in claim 18 and wherein the humidified air duct system is a support structure for the greenhouse having tubular structural members coupled together to form ducts.

20. The solar greenhouse as defined in claim 19 and wherein the structural members are painted black to absorb solar radiation and heat the humidified air.

21. The solar greenhouse as defined in claim 18 and further comprising means for selectively insulating the greenhouse during periods of heat loss from the greenhouse.

22. The solar greenhouse as defined in claim 21 and wherein the insulating means comprises automated curtains for the greenhouse walls.

23. A method of solar heating comprising:
growing plants to produce humidified air;
collecting the humidified air;
cooling the humidified air in a condensation bed to condense water vapor within the air to liquid condensate;
extracting heat from the condensation bed for use and for cooling the condensation bed; and
collecting the liquid condensate and extracting heat from the condensate for use.

24. The method as defined in claim 23 and further comprising:
heating the humidified air with solar radiation.